_United States Patent Office_

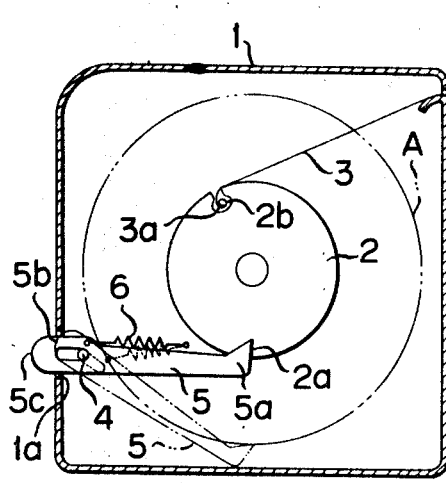
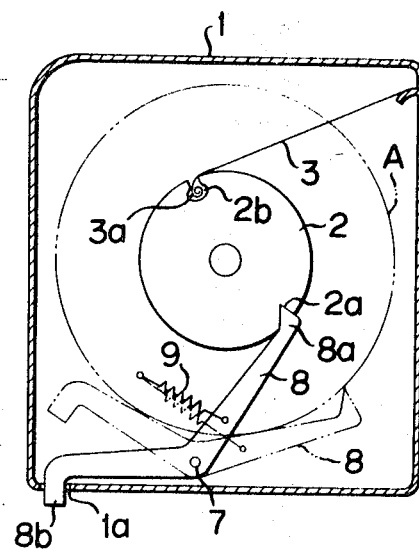
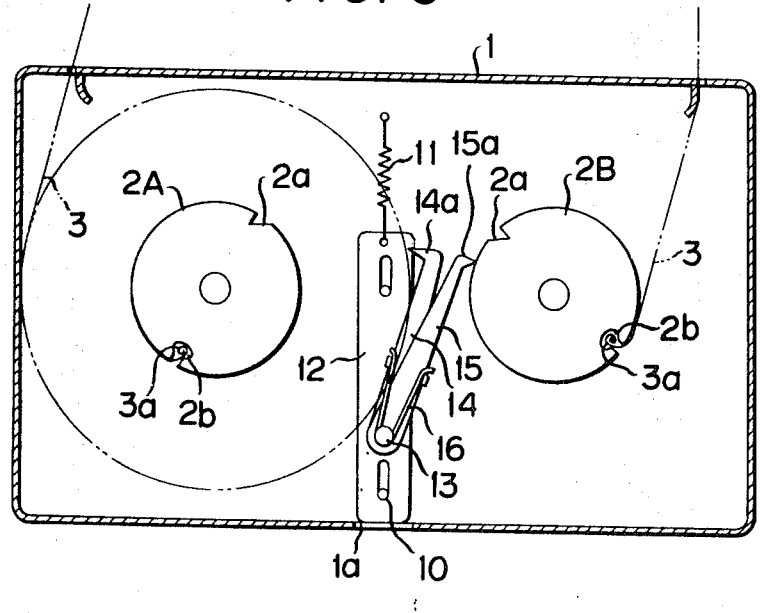

3,606,199
Patented Sept. 20, 1971

3,606,199
DEVICE FOR TERMINATING UNWINDING OF BELT-SHAPED BODY FROM A SPOOL
Sakae Fujimoto, Tokyo, Japan, assignor to Kabushiki Kaisha Ricoh, Tokyo, Japan
Filed Apr. 15, 1969, Ser. No. 816,199
Claims priority, application Japan, Apr. 17, 1968, 43/26,263
Int. Cl. B65h 25/04, 63/08; G11b 23/10
U.S. Cl. 242—187                                          5 Claims

ABSTRACT OF THE DISCLOSURE

Device for terminating unwinding of film or tape on a spool. A spring biased lever follows an unwinding and decreasing film supply to engage a notch on the spool for the termination. Signal means are provided in association with the lever to indicate the termination.

BACKGROUND OF THE INVENTION

The present invention relates to a device for controlling transportation of a belt-shaped body wound around a spool and more particularly to a device for controlling transportation of a belt-shaped body wound around a spool in such a manner that when the belt-shaped body wound around the spool is all unwound therefrom the transportation of the belt-shaped body is automatically stopped and/or the spool starts rewinding.

Recently magazines in which are incorporated film or tape are widely used in cine-cameras and tape recorders. The defects of such magazines are that an operator cannot see from the exterior of such magazine how much film or tape has been used and that an operator fails to notice the end of film or tape transportation. It is therefore preferable to provide a mechanism for a magazine which can stop automatically the transportation of film or tape when it is completely used or it is unwound from one spool and is wound around another spool or the like and which can automatically start rewinding operation while the termination of the use of film or tape and the rewinding operation can be indicated or represented in a form of signals.

There have been proposed some methods, devices and mechanisms for the purposes as described above, but they are not satisfactory in operation, mechanism and cost.

The primary object of the present invention is therefore to provide a device for controlling transportation of belt-shaped body such as tape, film or the like wound around a spool, which device can completely eliminate the defects encountered in the conventional device.

Another object of the present invention is to provide a device for controlling transportation of belt-shaped body wound around a spool and for indicating the state of transportation of the belt-shaped body or generating the signals for indicating said state.

SUMMARY OF THE INVENTION

In brief according to the present invention when the belt-shaped body wound around a spool is all unwound or supplied therefrom the leading end of a lever which is normally biased toward the axis of rotation of said spool engages with a notch formed at a suitable position of the periphery of the spool, thereby stopping automatically said spool and indicating the termination of unwinding of the belt-shaped body or generating the signals for indicating the termination.

According to one aspect of the present invention, a pair of spools are incorporated within one magazine so that the belt-shaped body such as film or tape may be alternately wound up by either of the pair of spools. Every time when the belt-shaped body is wound up by one spool, the above described control can be effected automatically.

According to another aspect of the present invention when the lever engages with said notches of the spool so that the spool is stopped, one end of the lever is extended out of the magazine, thereby indicating the termination or generating the signals.

The above and other objects, features and advantages of the present invention will become apparent from the following description taken in conjunction with the accompanying drawings.

BRIEF DESCRIPTION OF DRAWINGS

FIGS. 1, 2 and 3 are transverse sectional views of embodiments of the present invention.

DESCRIPTION OF THE PREFERRED EMBODIMENT

Referring to FIG. 1, a spool 2 within a magazine 1 has a notch 2a and a slit 2b into which is fitted the end of a belt-shaped body 3 so that it will not easily come off when pulled. Within the magazine 1 is pivotably fixed a control lever 5 having a pivot 4 which is fitted into an elongated slot 5b formed in the control lever. The control lever 5 has a tendency to rotate in the counterclockwise direction and to bias toward the right in the figure because of the provision of a spring 6.

In FIG. 1, the initial state in which the belt-shaped body 3 is fully wound up upon the spool is designated by the two-dot chain line A. From this state the belt-shaped body 3 is unwound or advanced and at the end of unwinding, the pawl 5a of the control lever 5 which rotates counterclockwise by the action of the spring 6 engages with the notch 2a of the spool 2 so that the control lever 5 is displaced toward the left against the spring 6, whereby the end portion 5a of the control lever 5 extends outwardly of the magazine 1 through an aperture 1a thereof, thereby indicating the end of the unwinding of the belt-shaped body 3. This extension of the control lever 5 may be utilized to generate, for example, electrical signals which may be used to automatically stop the rotation of the spool 2 upon termination of unwinding of the belt-shaped body 3 and, if desired, to start rewinding of the body 3.

Now referring to FIG. 2 illustrating the second embodiment of the present invention, the construction of the spool 2 having a length of belt-shaped body wound therearound is similar to that shown in FIG. 1 and this spool 2 is disposed also within the magazine 1. To a pivot 7 is pivotable fixed a control lever 8 having a pawl 8a which engages with the belt-shaped body 3 and with the spool 2 and also having a signal-generating portion 8b. The control lever 8 has a tendency to rotate in the counterclockwise direction in FIG. 2 by the action of the a spring 9. When the belt-shaped body 3 is sequentially unwound from the initial state thereof indicated by the two-dot chain line A, the control lever 8 is caused to rotate in the counterclockwise direction by the spring 9 and at the end of unwinding of the belt-shaped body 3, the pawl 8a of the control lever 8 engages with the notch 2a of the spool 2 and at the same time the signal-generating portion 8b of the control lever is caused to extend out of the magazine 1 through the aperture 1a thereof, thus indicating the end of the unwinding operation. The extension of the signal-generating portion 8b may be also utilized for automatically stopping the spool 2 at the end of the unwinding of the belt-shaped body 3 and, if desired, rewinding.

Next referring to FIG. 3 illustrating a third embodiment of the present invention, a pair of spools 2A and 2B are disposed in one magazine 1. Each of the pair of spools 2A and 2B has a notch 2a and a slit 2b into which is fitted or clamped the end 3a of belt-shaped body 3. A control plate 12 having a pin 10 fitted in an elongated slot formed in the plate 12 is normally biased inwardly by a spring 11. A pair of control levers 14 and 15 are pivotably fixed to a pin 13 extending from the control plate 12 and have a spring 16 loaded therebetween so that both of pawls 14a and 15a formed at the free ends of the control levers 14 and 15 respectively tend to open outwardly, that is to move away from each other so as to press against the belt-shaped body 3 or the spool 2. When the belt-shaped body 3 is being wound around the spool 2A, both of the control levers 14 and 15 are rotated in the clockwise direction in FIG. 3 and upon completion of winding the belt-shaped body 3 around the spool 2A, the control lever 15 is caused to engage with the notch 2a of the spool 2B by the spring 16. Further rotation of the spool 2B after the engagement of the pawl 15a with the notch 2a causes the control lever 15 to extend against the spring 11 forcing the control plate 12 outwardly of the magazine 1, thereby indicating the end of the winding of the belt-shaped body on one spool. This outward extension of plate 12 may be also used for automatically stopping both of the spools 2A and 2B upon completion of the winding upon one spool of belt-shaped body 3 and if desired for reversing the direction of transportation of the belt-shaped body 3. On the other hand, when the belt-shaped body 3 is wound around the spool 2B, both of the control levers 14 and 15 are rotated in the counterclockwise direction and upon completion of winding the belt-shaped body 3 around the spool 2B, that is when the spool 2A is emtpied, the control lever 14 engages with the notch 2a so that the control plate 12 is extended outwardly of the magazine 1, as in the case of the winding the belt-shaped body 3 around the spool 2A, thereby indicating the termination of winding the belt-shaped body 3 around the spool 2B.

As described in detail hereinabove, according to the present invention the termination of winding or use of a belt-shaped body can be positively indicated by a simple mechanism comprising a notch formed in a spool around which is wound a length of belt-shaped body and a lever for engagement with said notch. Furthermore, if desired, the rotation of the spool can be automatically stopped at the termination of winding or use of the belt-shaped body and the rewinding or the reversing of the direction of transportation of the belt-shaped body can be also automatically effected. It will be readily seen therefore that the device of the present invention can be advantageously used with a cine-camera, tape recorder and so on and that the mechanical indication of the control lever or plate can be readily transduced into electrical signals or other signals which can be advantageously used in controlling the transportation of the belt-shaped body such as film, tape and so on.

The present invention has been so far described in detail with particular reference to preferred embodiments thereof, but it will be understood that variations and modifications can be effected without departing from the true spirit of the present invention as described hereinabove and as defined in the appended claims.

I claim:

1. A device for terminating the unwinding of film or the like that has been wound on a spool, comprising
a magazine housing having an opening therein;
said spool rotatably mounted in said housing and having a notch formed in its periphery;
lever means pivotally mounted on said housing, said lever means positioned to have one end thereof contacting the film on said spool;
spring means connected to exert a biasing force on said lever means;
said one end being biased against the film and thereby moving toward the center of said spool as the film unwinds;
said one end formed to fit within said notch when said film is unwound thereby terminating the unwinding movement; and
the other end of said lever means formed of a size to pass through said opening to the outside of said housing when said one end is positioned within said notch, the said other end projecting through said opening thereby signaling the termination of the unwinding.

2. A device according to claim 1, in which a slit is formed in the periphery of said spool substantially diametrically opposite from said notch, and an end of the film or the like is fastened in said slit.

3. A device according t oclaim 1, in which said lever means comprises an elongated bar, the pivot mounting of said bar comprises a pin within a slot, and said pin slides within said slot to cause said other end to slide linearly to pass through said opening.

4. A device according to claim 1, in which said lever means comprises two arms extending angularly from each other with the pivot mounting located at their juncture, one arm including said one end and the other arm including said other end, said arm being rotatable about said pivot mounting to allow said other end to pass through said opening.

5. A device according to claim 1, in which a second spool is provided having a notch formed in its periphery, said two spools cooperating for alternate winding and unwinding of the film, said lever means comprises an elongated slide and two elongated bars positioned between said spools, each bar having said one end for fitting respectively within said notch in each said spool, each bar having its other end pivotally mounted on a common pivot on said slide, said spring means biasing both said bars to move apart from each other toward a respective spool, a second spring means provided to be connected to one end of said slide for biasing said slide to be maintained within said housing prior to termination of the unwinding, said other end of said lever means formed as the other end of said slide and passing through said opening against the bias of said second spring means when one of said one ends of said bars fits within one said respective notch to cause linear sliding movement of said slide.

References Cited

UNITED STATES PATENTS

| | | | |
|---|---|---|---|
| 2,089,330 | 8/1937 | Becker | 352—78UX |
| 2,578,283 | 12/1951 | Bornemann et al. | 242—71.1X |
| 3,458,157 | 7/1969 | Wells | 242—57X |

FOREIGN PATENTS

| | | | |
|---|---|---|---|
| 322,224 | 11/1934 | Italy | 352—78 |

OTHER REFERENCES

Hummel: German printed application 1,142,069 published January 1963.

GEORGE F. MAUTZ, Primary Examiner

U.S. Cl. X.R.

242—57, 197, 199